United States Patent
Kim et al.

(10) Patent No.: US 12,500,312 B2
(45) Date of Patent: Dec. 16, 2025

(54) BATTERY MODULE INCLUDING BUSBAR HAVING SCREW THREAD

(71) Applicant: LG ENERGY SOLUTION, LTD., Seoul (KR)

(72) Inventors: Tae Geun Kim, Daejeon (KR); Young Il Yoon, Daejeon (KR); Tae Kyeong Lee, Daejeon (KR)

(73) Assignee: LG ENERGY SOLUTIONS, LTD, Seoul (KR)

( * ) Notice: Subject to any disclaimer, the term of this patent is extended or adjusted under 35 U.S.C. 154(b) by 600 days.

(21) Appl. No.: 17/914,701

(22) PCT Filed: Oct. 22, 2021

(86) PCT No.: PCT/KR2021/014952
§ 371 (c)(1),
(2) Date: Sep. 26, 2022

(87) PCT Pub. No.: WO2022/086287
PCT Pub. Date: Apr. 28, 2022

(65) Prior Publication Data
US 2023/0178859 A1    Jun. 8, 2023

(30) Foreign Application Priority Data

Oct. 23, 2020   (KR) .......................... 10-2020-0138398

(51) Int. Cl.
*H01M 50/517*   (2021.01)
*H01M 10/48*   (2006.01)
(Continued)

(52) U.S. Cl.
CPC ......... *H01M 50/517* (2021.01); *H01M 10/48* (2013.01); *H01M 50/503* (2021.01); *H01R 4/308* (2013.01); *H02G 5/02* (2013.01)

(58) Field of Classification Search
CPC .. H01M 10/48; H01M 50/296; H01M 50/503; H01M 50/505; H01M 50/517;
(Continued)

(56) References Cited

U.S. PATENT DOCUMENTS

2006/0105624 A1   5/2006   Yoshikane et al.
2013/0045401 A1   2/2013   Yoon et al.
(Continued)

FOREIGN PATENT DOCUMENTS

CN   2502408 Y   7/2002
CN   203760533 U   8/2014
(Continued)

OTHER PUBLICATIONS

Machine translation CN208955358U (Year: 2019).*
Machine translation KR1020170067007 (Year: 2020).*

*Primary Examiner* — Victoria H Lynch
(74) *Attorney, Agent, or Firm* — Bryan Cave Leighton Paisner LLP

(57) ABSTRACT

A battery module includes a busbar. The busbar that electrically connects electrode leads protruding from an electrode assembly to the busbar. The battery module also includes a busbar frame accommodating the busbar. The busbar is fixed to the busbar frame. The battery module also includes a connection busbar connected to the busbar and a connection bolt connecting the busbar and the connection busbar together. The busbar includes a first screw thread, and the connection bolt is fixed to the first screw thread.

14 Claims, 10 Drawing Sheets

(51) Int. Cl.
 *H01M 50/503* (2021.01)
 *H01R 4/30* (2006.01)
 *H02G 5/02* (2006.01)

(58) Field of Classification Search
 CPC ... H01M 50/526; H01R 11/281; H01R 4/308; H01R 4/34; H01R 4/36; H02G 5/02; Y02E 60/10
 See application file for complete search history.

(56) References Cited

U.S. PATENT DOCUMENTS

| | | |
|---|---|---|
| 2015/0023392 A1 | 1/2015 | Noh et al. |
| 2018/0159096 A1 | 6/2018 | Kim et al. |
| 2020/0112014 A1 | 4/2020 | Kim et al. |
| 2020/0321589 A1 | 10/2020 | Watahiki et al. |
| 2020/0411832 A1 | 12/2020 | Jin et al. |
| 2021/0164511 A1 | 6/2021 | Jeong et al. |
| 2021/0218114 A1 | 7/2021 | Chida et al. |
| 2021/0265705 A1 | 8/2021 | Min et al. |
| 2021/0391632 A1 | 12/2021 | Kim et al. |
| 2023/0238658 A1 | 7/2023 | Chida et al. |

FOREIGN PATENT DOCUMENTS

| | | |
|---|---|---|
| CN | 107710450 A | 2/2018 |
| CN | 208955358 U | 6/2019 |
| CN | 209675383 U | 11/2019 |
| CN | 110892552 A | 3/2020 |
| CN | 111164795 A | 5/2020 |
| CN | 213636215 U | 7/2021 |
| JP | 2006147319 A | 6/2006 |
| JP | 2011-249243 A | 12/2011 |
| JP | 2014-022238 A | 2/2014 |
| JP | 2016-134275 A | 7/2016 |
| JP | 2020-522096 A | 7/2020 |
| JP | 2020521288 A | 7/2020 |
| KR | 10-2013-0019697 A | 2/2013 |
| KR | 10-1340062 B1 | 12/2013 |
| KR | 10-2017-0067007 A | 6/2017 |
| KR | 10-1826933 B1 | 2/2018 |
| KR | 101928066 B1 | 12/2018 |
| KR | 10-2047794 B1 | 11/2019 |
| KR | 1021154810000 B1 | 5/2020 |
| KR | 10-2020-0102292 A | 8/2020 |
| WO | 2019/069837 A1 | 4/2019 |
| WO | 2019/244402 A1 | 12/2019 |
| WO | 2020/138821 A1 | 7/2020 |
| WO | 2020-149704 A1 | 7/2020 |

\* cited by examiner

[FIG. 1]
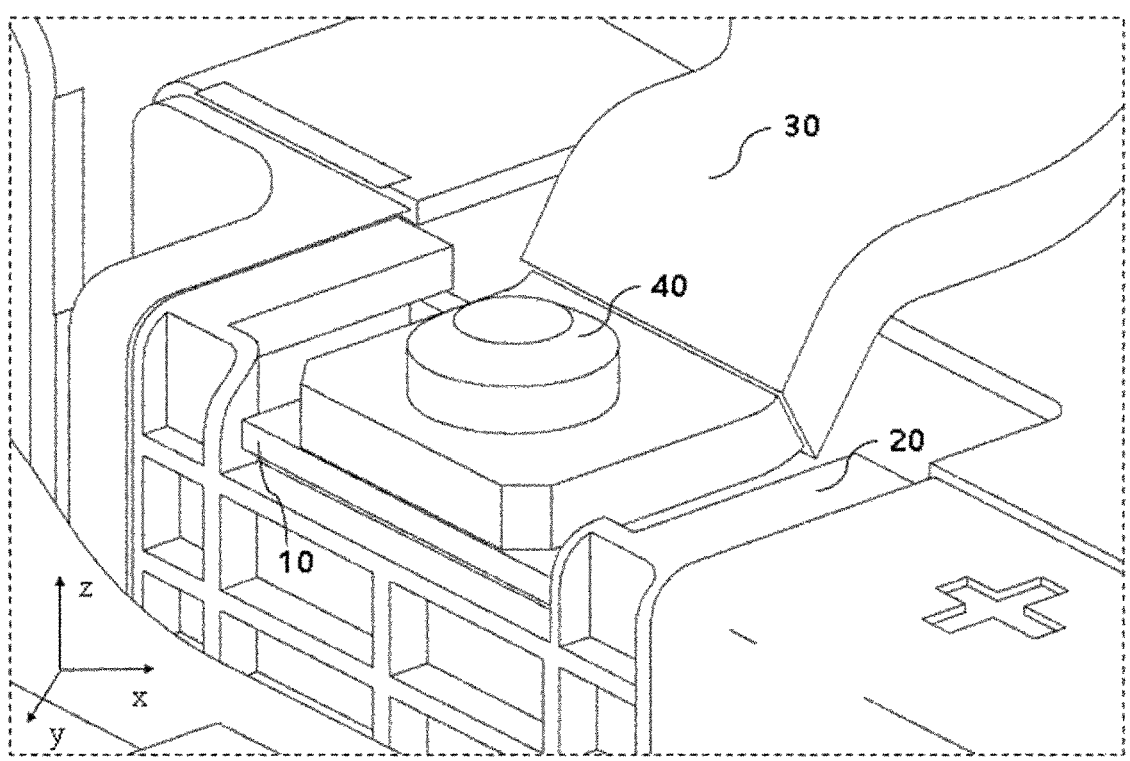

[FIG. 2]
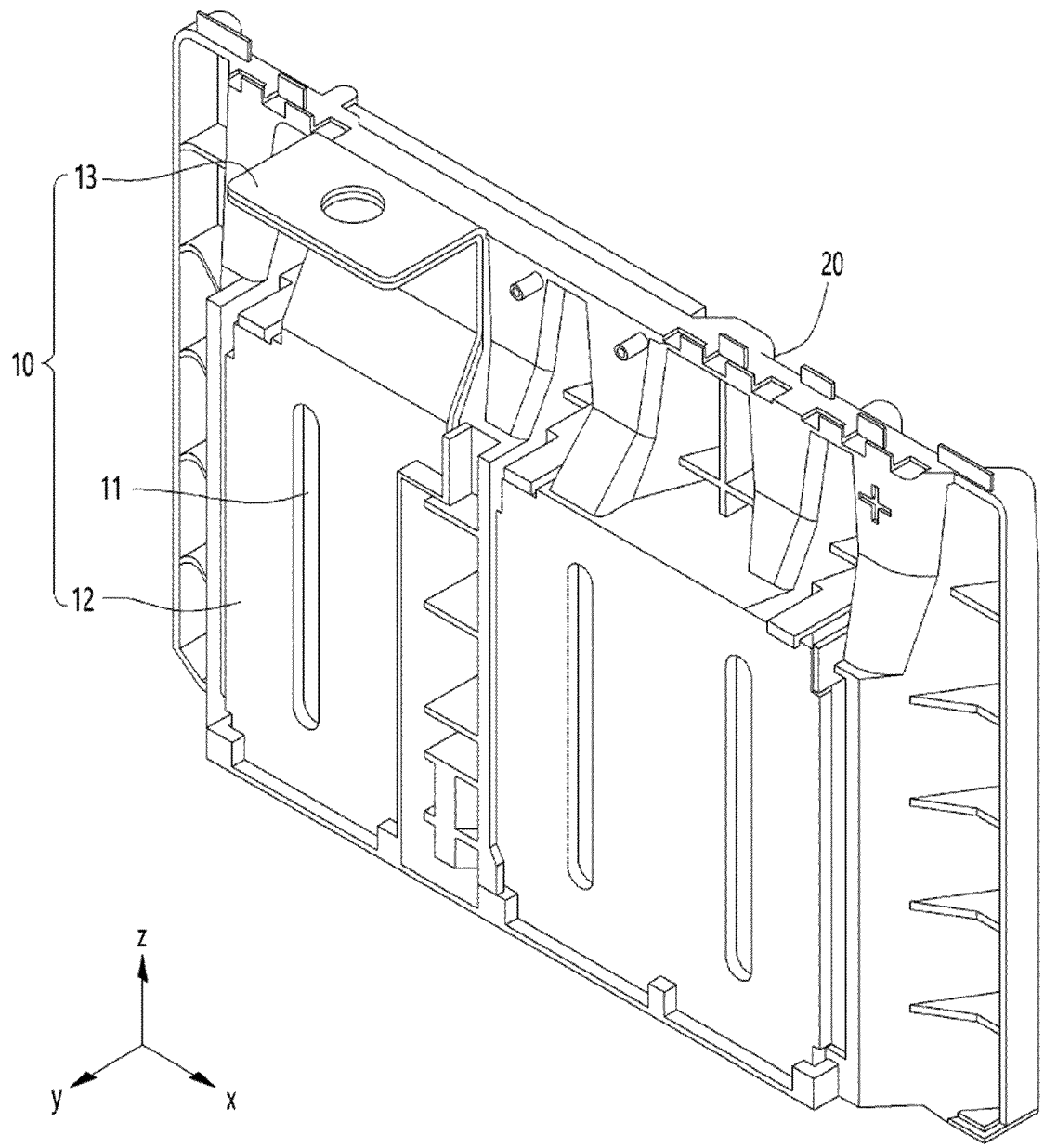

【FIG. 3】
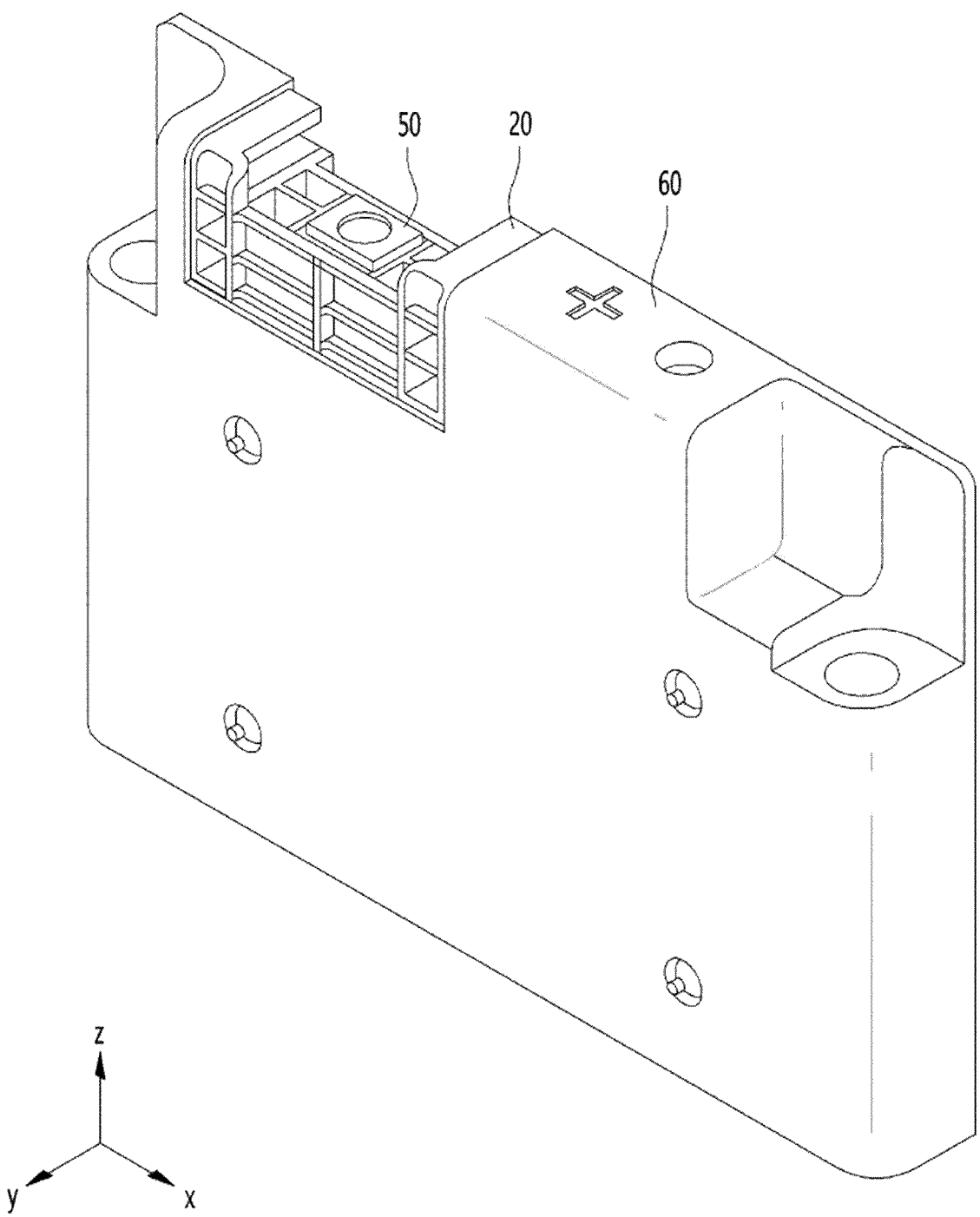

【FIG. 4】
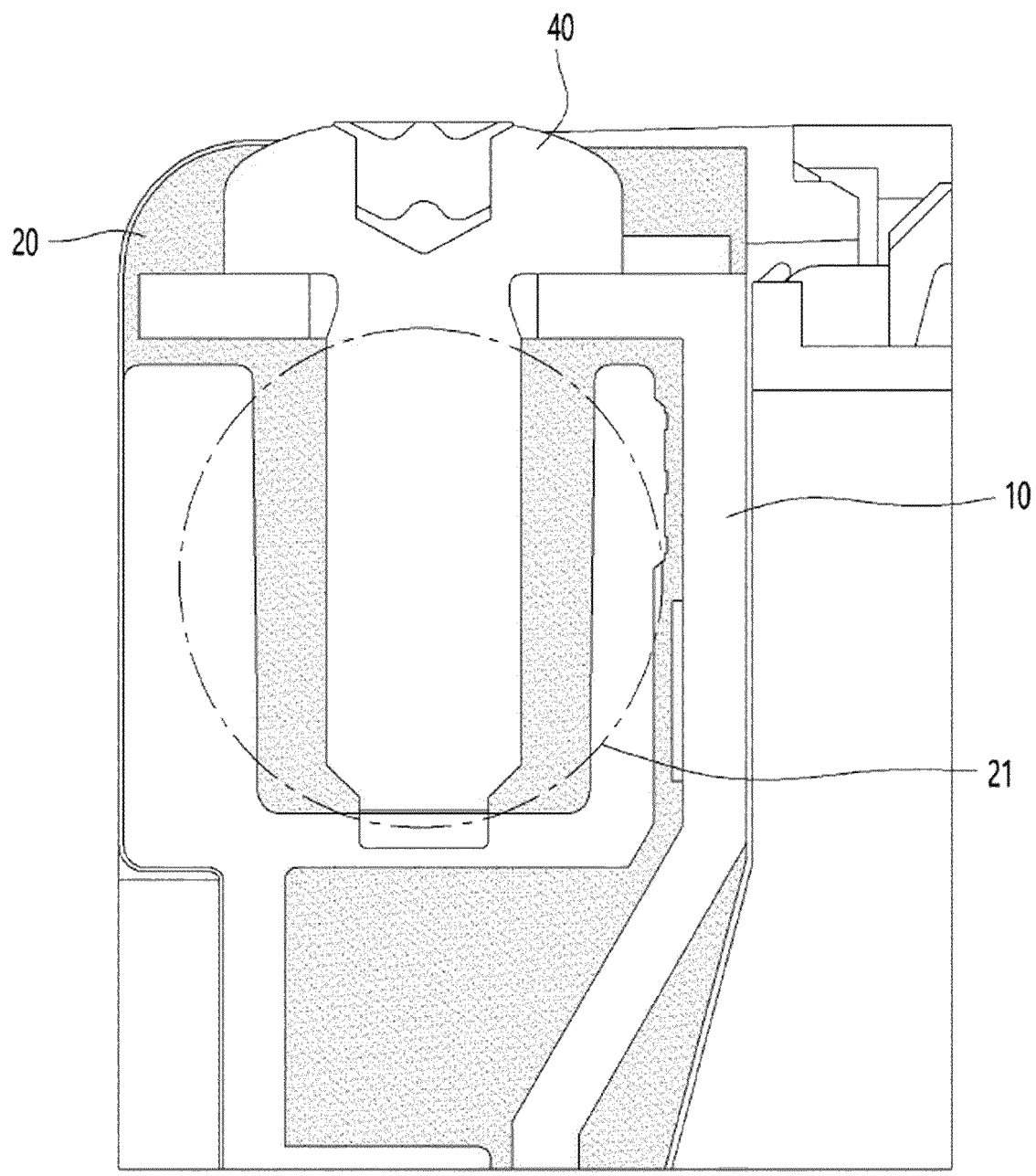

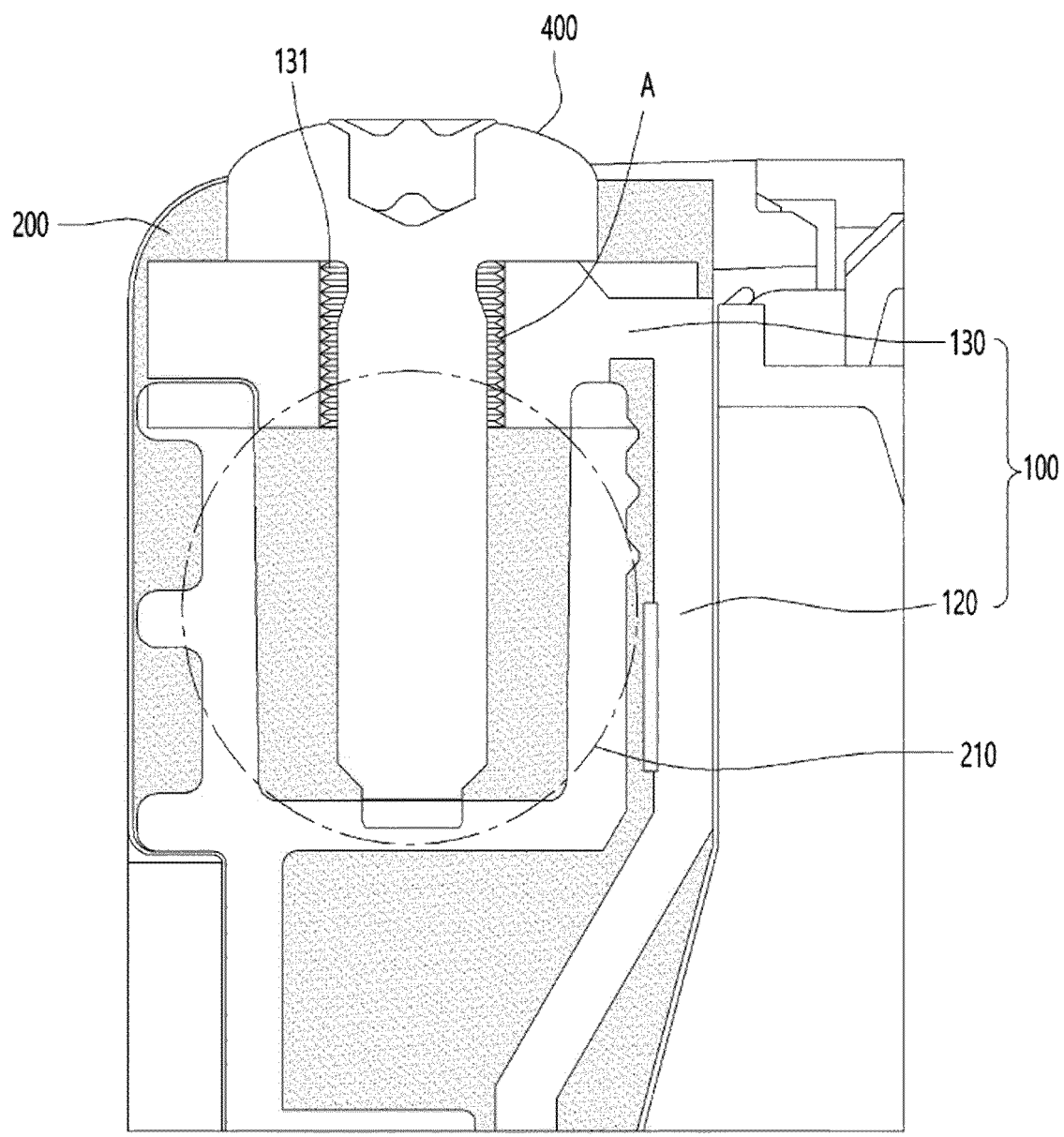
[FIG. 5]

[FIG. 6]
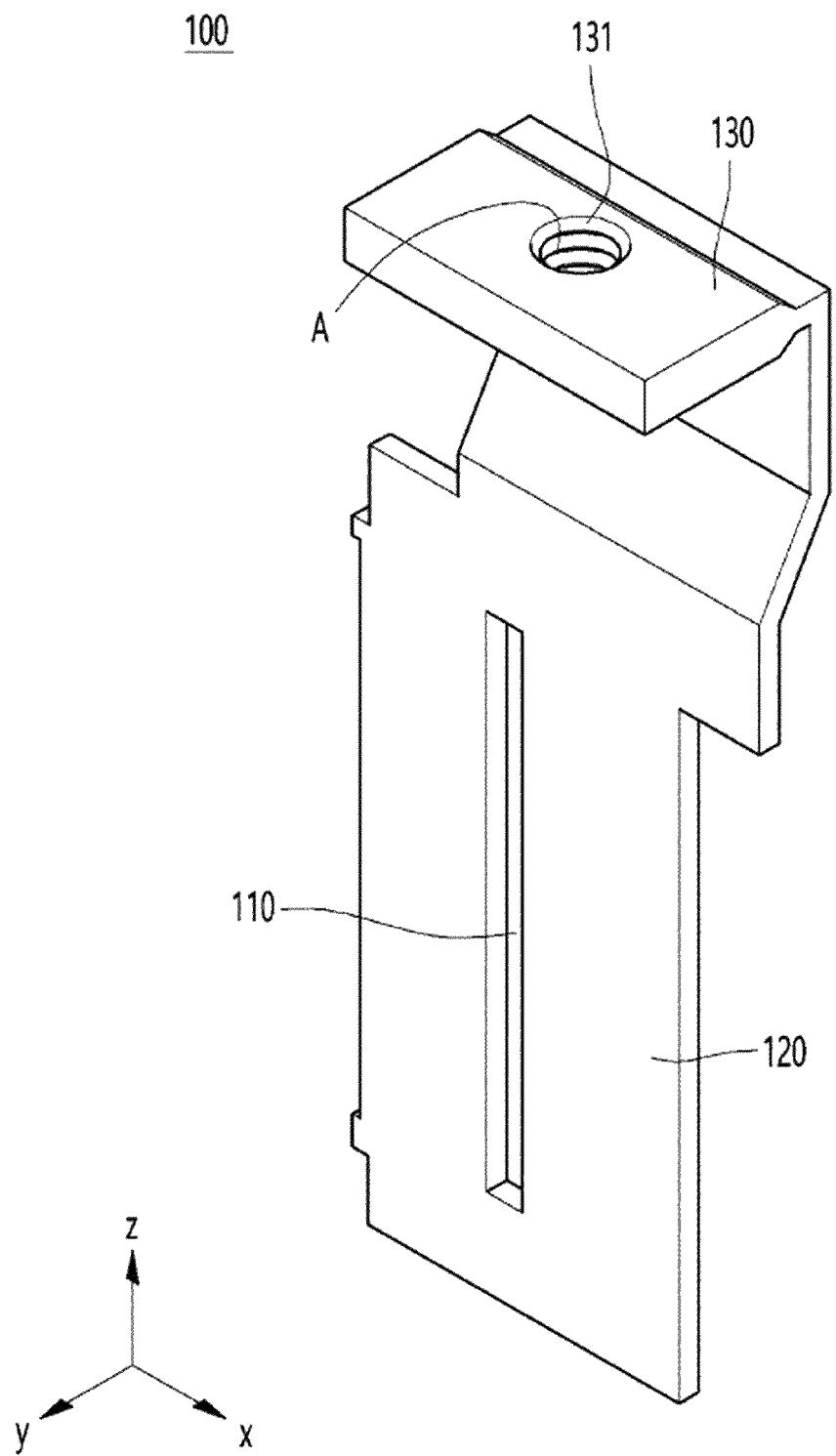

[FIG. 7]
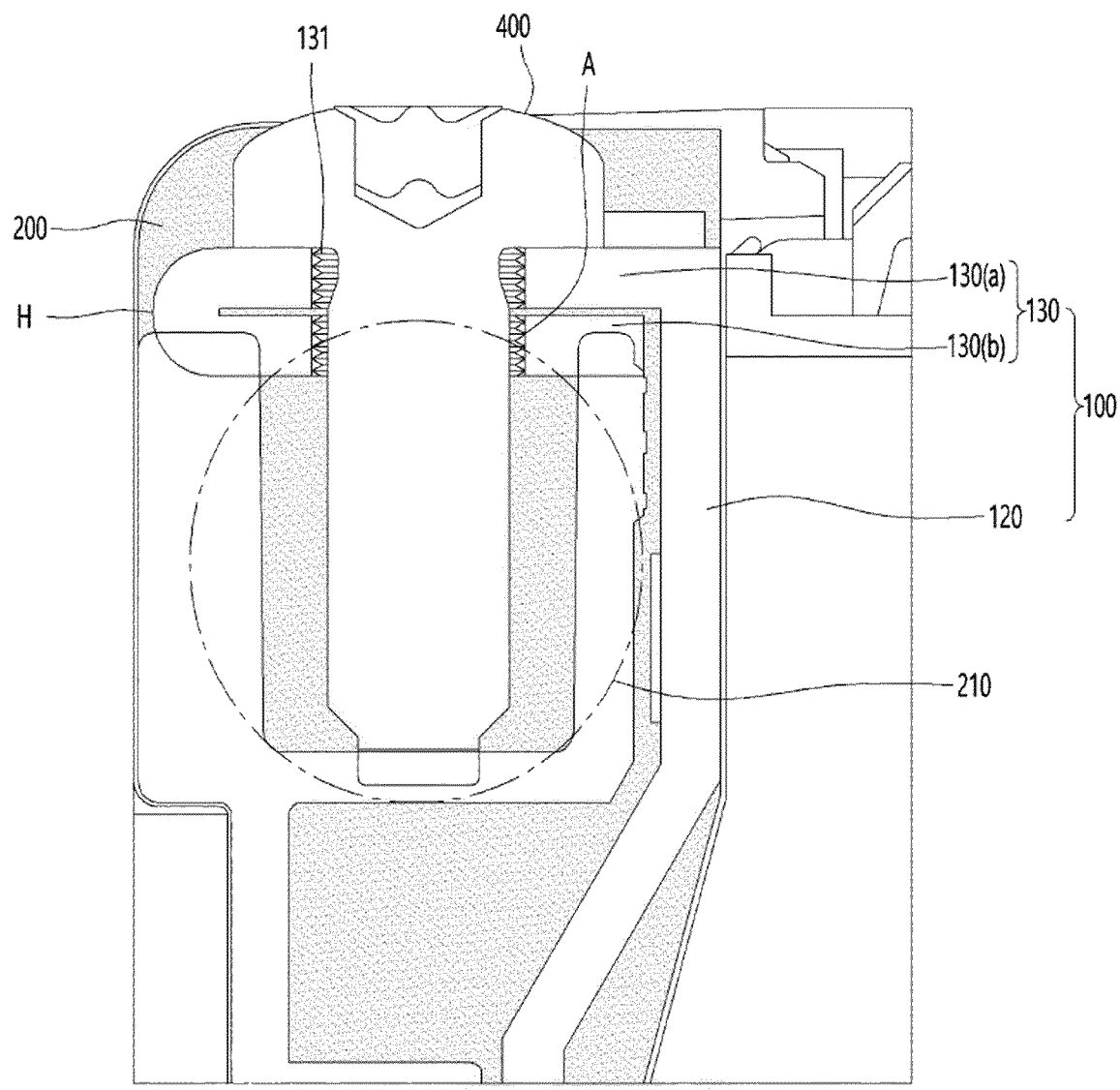

【FIG. 8】
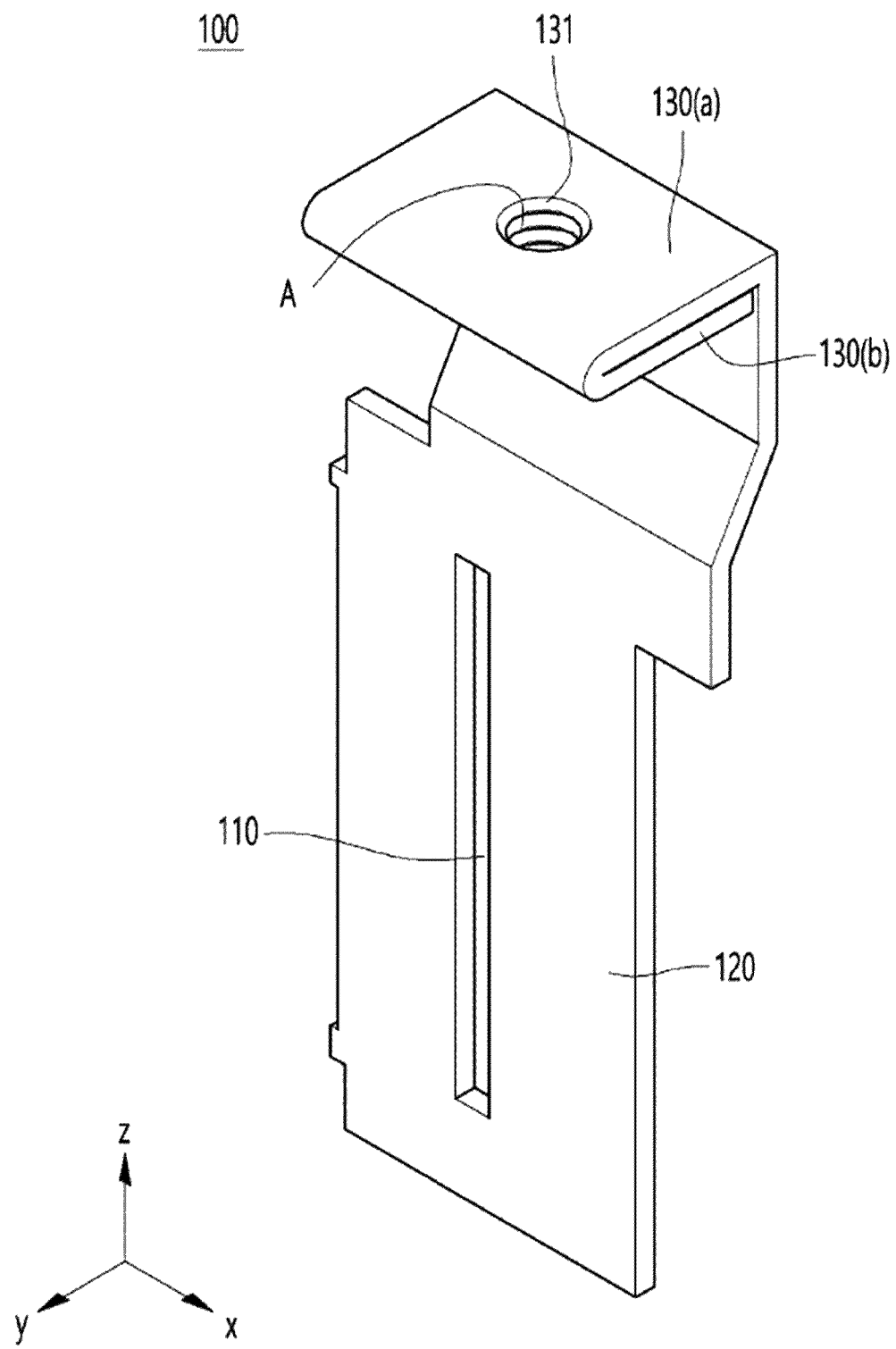

[FIG. 9]
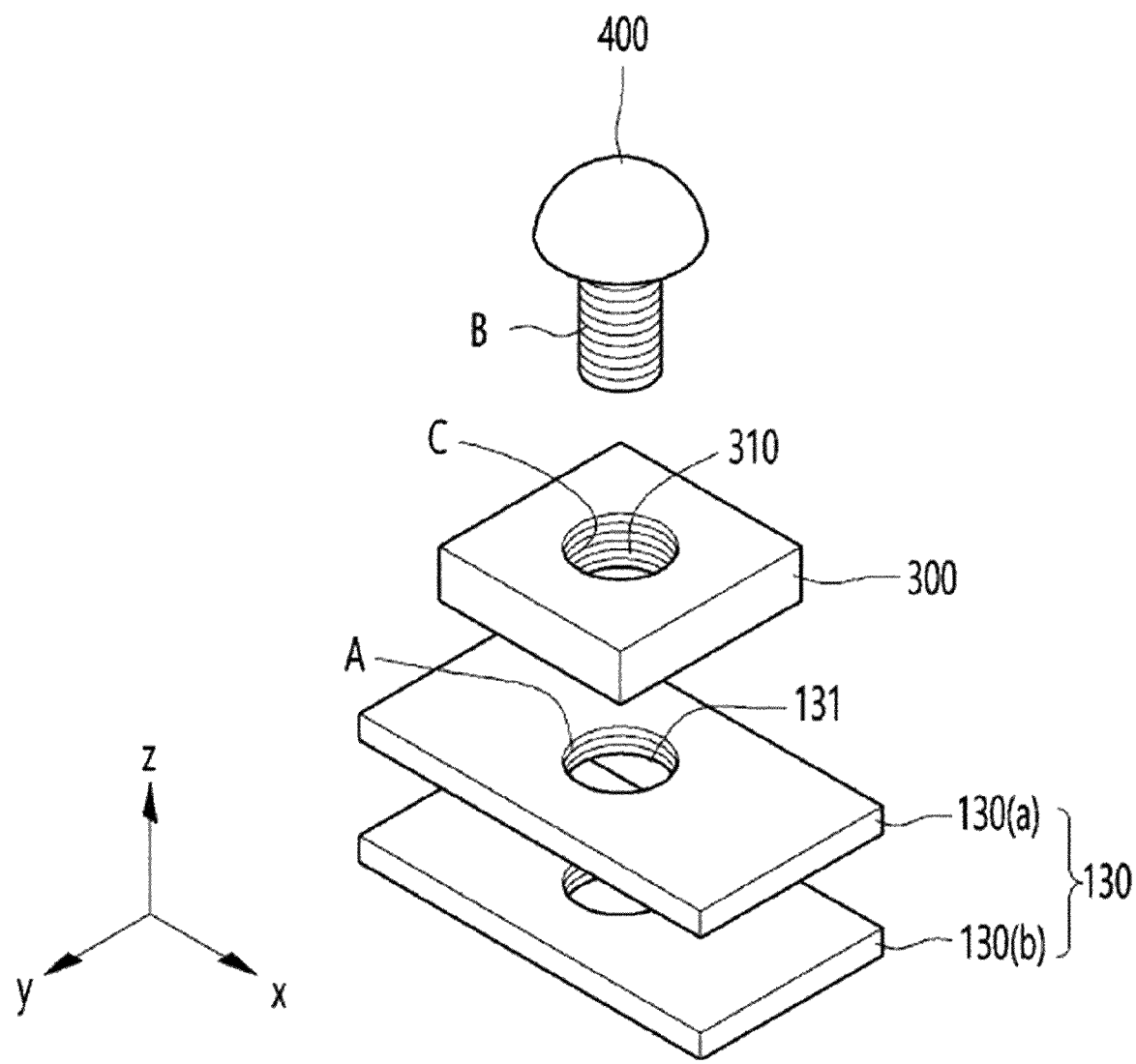

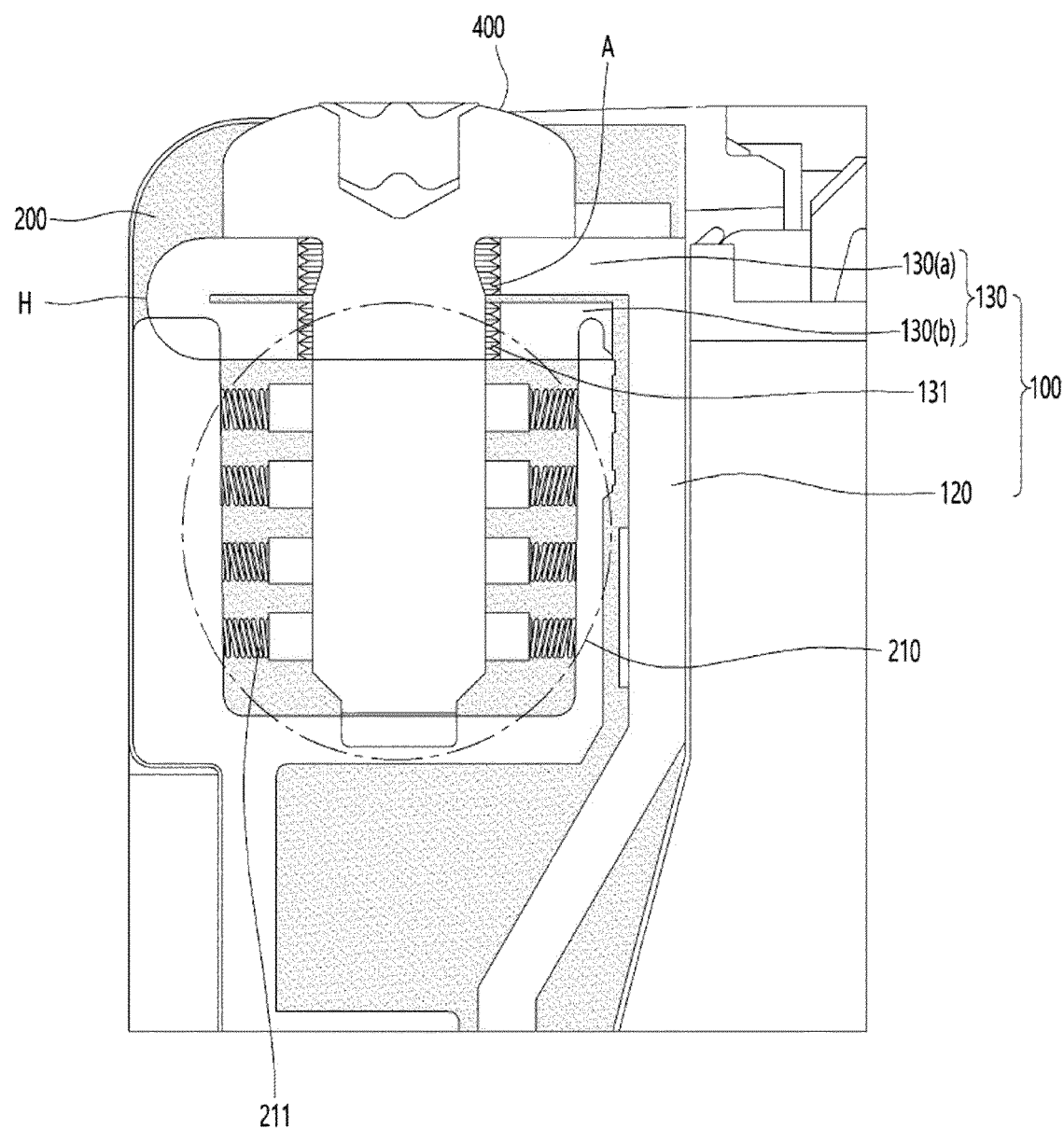
[FIG. 10]

BATTERY MODULE INCLUDING BUSBAR HAVING SCREW THREAD

CROSS-REFERENCE TO RELATED APPLICATION(S)

This is a National Phase entry pursuant to 35 U.S.C. 371 of International Application No. PCT/KR2021/014952 filed on Oct. 22, 2021, and claims priority to and the benefit of Korean Patent Application No. 10-2020-0138398 filed on Oct. 23, 2020, the disclosure of which is incorporated herein by reference in its entirety.

TECHNICAL FIELD

The present disclosure relates to a battery module including a busbar having a screw thread, and more particularly to a battery module having no separate connection nut necessary to fix a connection bolt configured to connect a busbar and a connection busbar to each other.

BACKGROUND

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

In a battery module, a plurality of battery cells is connected to each other in series and in parallel, whereby the capacity and output of the battery module are increased. In general, the battery module includes a busbar configured to electrically connect the battery cells to each other and a connection busbar configured to connect a plurality of busbars to each other.

FIG. 1 is an upper perspective view of a conventional battery module, FIG. 2 is a perspective view of a conventional busbar and a conventional busbar frame, FIG. 3 is a perspective view of the conventional busbar frame and a conventional end cover, and FIG. 4 is a side sectional view of the conventional battery module.

The conventional battery module includes a busbar 10, to which electrode leads protruding from an electrode assembly are connected, a busbar frame 20 configured to fix the busbar 10, and a connection busbar 30 configured to electrically connect one or more busbars 10 to each other.

In general, the busbar 10 and the connection busbar 30 are connected to each other by joining, bolt fastening, or fitting. In the present disclosure, however, a connection bolt 40 is provided in order to couple the busbar 10 and the connection busbar 30 to each other, whereby the force of fixing between the busbar 10 and the connection busbar 30 is increased.

The busbar 10 includes a slit 11 configured to allow each of the electrode leads to extend therethrough, an electrode lead connection portion 12, to which the portion of the electrode lead extending through the slit 11 is coupled, and a terminal portion 13 configured to connect the busbar 10 and the connection busbar 30 to each other.

The terminal portion 13 may protrude from the electrode lead connection portion 12 and may then be bent. The terminal portion 13 is provided with a fixing hole for connection with the connection busbar 30. The connection bolt 40 extends through the fixing hole of the terminal portion 13 and a bolt hole of the connection busbar 30, and is then coupled to a connection nut 50 integrally formed at the busbar frame 20, which is coupled to an end cover 60.

The connection nut 50 is located at a bolt receiving portion 21 of the busbar frame 20. In order to integrally form the connection nut 50 and the busbar frame 20, a process of integrating the connection nut 50 and the busbar frame 20 is required.

In particular, a predetermined strength is required for the connection nut 50 in order to achieve coupling between the connection bolt 40 and the connection nut 50. Consequently, the connection nut must be made of a material different from the material for the busbar frame 20, and therefore it is difficult to manufacture the connection nut.

Furthermore, the busbar frame 20 must also have a predetermined thickness due to the connection nut 50, and a separate space for the connection nut 50 is necessary.

In Patent Document 1, a rivet is located at a resistance weld region between an electrode lead and an electrode terminal in order to connect the electrode lead and the electrode terminal to each other. However, since a female rivet and a male rivet are used, there is a problem in that a separate space for receiving the rivets is required. In addition, it has a disadvantage in that the force of fixing may be reduced when the force of fixing between the female rivet and the male rivet is reduced.

Therefore, there is a necessity for technology capable of reducing a space for fixing while providing predetermined coupling force when a busbar and a connection busbar are connected to each other.

PRIOR ART DOCUMENT (Patent Document 1) Korean Registered Patent Publication No. 10-1340062 (2013.12.04)

SUMMARY

The present disclosure has been made in view of the above problems, and it is an object of the present disclosure to provide a battery module capable of fixing a busbar and a connection busbar to each other using a single fixing means while reducing a fixing space and fixing expense.

In order to accomplish the above object, a battery module according to the present disclosure includes at least one busbar configured to electrically connect electrode leads protruding from an electrode assembly; a busbar frame connected to the busbar, the busbar frame being configured to fix the busbar; a connection busbar configured to connect the at least one busbar; and a connection bolt configured to connect the busbar and the connection busbar to each other, wherein the busbar has a screw thread configured to fix the connection bolt.

The busbar may include a slit configured to allow each of the electrode leads to extend therethrough, an electrode lead connection portion configured to fix the electrode lead, and a terminal portion configured to be connected to the connection busbar, and the terminal portion may include a fixing hole configured to be coupled to the connection busbar by the connection bolt, the fixing hole being provided with a screw thread configured to fix the connection bolt.

No separate nut configured to fix the connection bolt may be included.

The thickness of the terminal portion may be greater than the thickness of the electrode lead connection portion.

The terminal portion may be configured to have two or more layers.

The terminal portion may be bent using a hemming method.

The screw thread may be formed in all of the two or more layers of the terminal portion.

No separate space may be provided between the two or more layers.

A portion of the busbar excluding the terminal portion may be compressed.

A portion of the terminal portion that is connected to the electrode lead connection portion may be compressed.

The connection busbar may be further provided with a screw thread configured to fix the connection bolt.

The busbar frame may include a bolt receiving portion configured to receive the end of the connection bolt after extending through the busbar and the connection busbar, and the bolt receiving portion may include a fixing portion configured to push the end of the connection bolt in a direction perpendicular to an insertion direction.

The fixing portion may be made of an elastic material.

The present disclosure provides a battery pack including the battery module or a device having the battery module mounted therein.

In the present disclosure, one or more constructions that do not conflict with each other may be selected and combined from among the above constructions.

As is apparent from the above description, in a battery module according to the present disclosure, a screw thread configured to connect a busbar and a connection busbar to each other using a connection bolt is provided in the busbar, whereby no separate nut is needed. Consequently, a separate space for receiving a connection nut is not necessary, and a process of integrally forming the connection nut at a busbar frame is not necessary.

In addition, the screw thread is provided in the busbar, and only the thickness of a terminal portion at which the busbar and the connection busbar are connected to each other is increased, whereby coupling force of the connection bolt for connecting the busbar and the connection busbar to each other is increased. In addition, a screw thread is also provided in the connection busbar in order to fix the connection bolt, and a separate fixing portion is provided at the position of a conventional nut, whereby coupling force is increased.

Furthermore, since the fixing portion is located at the position of the conventional nut, it is possible to check, through the fixing portion, whether the connection bolt is properly coupled.

BRIEF DESCRIPTION OF THE DRAWINGS

FIG. 1 is an upper perspective view of a conventional battery module.

FIG. 2 is a perspective view of a conventional busbar and a conventional busbar frame.

FIG. 3 is a perspective view of the conventional busbar frame and a conventional end cover.

FIG. 4 is a side sectional view of the conventional battery module.

FIG. 5 is a side sectional view of a battery module according to a first embodiment of the present disclosure.

FIG. 6 is a perspective view of a busbar according to a first embodiment of the present disclosure.

FIG. 7 is a side sectional view of a battery module according to a second embodiment of the present disclosure.

FIG. 8 is a perspective view of a busbar according to a second embodiment of the present disclosure.

FIG. 9 is a perspective view showing the connection relationship between the busbar according to the second embodiment of the present disclosure, a connection busbar, and a connection bolt.

FIG. 10 is a sectional view of a battery module according to a third embodiment of the present disclosure.

DETAILED DESCRIPTION

Now, preferred embodiments of the present disclosure will be described in detail with reference to the accompanying drawings such that the preferred embodiments of the present disclosure can be easily implemented by a person having ordinary skill in the art to which the present disclosure pertains. In describing the principle of operation of the preferred embodiments of the present disclosure in detail, however, a detailed description of known functions and configurations incorporated herein will be omitted when the same may obscure the subject matter of the present disclosure.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all disclosures, unless particularly restricted, and does not limit a specific disclosure.

Also, in the description of the disclosure and the claims of the present application, singular forms are intended to include plural forms unless mentioned otherwise.

Also, in the description of the disclosure and the claims of the present application, "or" includes "and" unless mentioned otherwise. Therefore, "including A or B" means three cases, namely, the case including A, the case including B, and the case including A and B.

FIG. 5 is a side sectional view of a battery module according to a first embodiment of the present disclosure, and FIG. 6 is a perspective view of a busbar according to a first embodiment of the present disclosure.

The battery module according to the first embodiment includes at least one busbar 100 configured to connect electrode leads protruding from an electrode assembly, a busbar frame 200 connected to the busbar 100, the busbar frame being configured to fix the busbar 100, a connection busbar 300 configured to connect the at least one busbar 100, and a connection bolt 400 configured to connect the busbar 100 and the connection busbar 300 to each other, wherein the busbar 100 has a screw thread A configured to fix the connection bolt 400.

The busbar 100 includes a slit 110 configured to allow each of the electrode leads to extend therethrough, an electrode lead connection portion 120 configured to fix the electrode lead, and a terminal portion 130 configured to face the connection busbar 300, wherein the terminal portion 130 includes a fixing hole 131 configured to be coupled to the connection busbar 300 by the connection bolt 400, and the fixing hole 131 is provided with a screw thread A configured to fix the connection bolt 400.

The slit 110 of the busbar 100 is a space formed in the electrode lead connection portion 120, which is a space configured to allow the electrode lead to extend therethrough.

The electrode lead protruding from the electrode assembly extends through the slit 110, is bent, and is fixed to the outer surface of the electrode lead connection portion 120 using a well-known fixing method, such as laser welding or resistance welding.

The busbar 100 may connect electrode leads having the same polarity, or may connect electrode leads having different polarities, to connect the electrode assembly in series or in parallel.

The busbar 100 may be made of a metal material that exhibits high conductivity so as to easily move electrons transmitted by the electrode lead without loss. The electrode lead connection portion 120 and the terminal portion 130 according to the present disclosure are made of the same material, and are integrally formed.

The terminal portion 130 may be bent so as to face a direction different from a direction in which the electrode lead connection portion 120 faces. As an example, the terminal portion 130 may be bent so as to be perpendicular to the electrode lead connection portion 120, as shown in FIG. 6.

The terminal portion 130 includes a fixing hole 131 configured to be coupled to the connection busbar 300 by the connection bolt 400, and the fixing hole 131 has a screw thread A configured to fix the connection bolt.

The fixing hole 131 may have the same size as the diameter of a body portion of the connection bolt 400 so as to fix the connection bolt 400. The fixing hole 131 is provided in the inner surface thereof with a screw thread A in order to perform the function of a conventional connection nut, and the screw thread is coupled to a screw valley B of the connection bolt 400 in order to fix the connection bolt 400.

It is preferable for the screw thread A to have a minimum size of 4 mm based on an M6 connection bolt. Although being changed depending on the shape of the connection bolt 400, it is preferable for the screw thread A to have a size of 4 mm or more so as to be maintained in a connected state even when impact is applied to the busbar 100 and the connection busbar 300.

To this end, in the busbar 100 according to the first embodiment of the present disclosure, the thickness of the terminal portion 130 at which the fixing hole 131 is located may be 4 mm or more. If the busbar 100 is too thick, however, the object of the present disclosure of securing a space by removing the connection nut is not accomplished. In the busbar 100 according to the present disclosure, therefore, the portion of the busbar 100 excluding the terminal portion 130 is compressed, whereby the thickness of the remaining portion of the busbar 100, i.e. the electrode lead connection portion 120, is reduced while the terminal portion 130 is maintained thick, and therefore the portion included in the battery module may be maintained thin.

In addition, a portion of the terminal portion 130 at which the terminal portion 130 and the electrode lead connection portion 120 are connected to each other may be compressed, whereby the portion excluding the portion configured to fix the busbar 100 and the connection busbar 300 may be maintained so as to perform only the function thereof.

The busbar frame 200 also performs a function of preventing the busbar 100 from contacting another member while fixing the busbar 100. The busbar frame 200 according to the present disclosure may perform a function of fixing the portion of the busbar 100 corresponding to the lower surface of the terminal 130. The surface of the terminal portion 130 that does not face the connection busbar 300, i.e. the lower surface of the terminal portion 130, faces the busbar frame 200. A predetermined protrusion is formed on the lower surface of the terminal portion 130, and the protrusion may be fixed to the corresponding portion of the busbar frame 200, or may be fixed by joining or fitting. At this time, the busbar frame 200, to which the terminal portion 130 is fixed, may be a busbar frame different from the busbar frame 200 configured to fix the terminal portion 130, e.g. a busbar frame coupled to an end cover.

The connection busbar 300 connects the busbar 100 to an external device, or connects two or more busbars 100 to each other. The portion of the connection busbar 300 that contacts the busbar 100 may be made of a conductive metal so as to move electricity transmitted by the busbar 100, and the outer surface of the portion of the connection busbar that does not contact the busbar 100 may be wrapped with an insulating material.

The connection bolt 400 may include a head portion configured to have a diameter greater than the diameter of a bolt hole 310 of the connection busbar 300 and the diameter of the fixing hole 131 of the busbar 100 so as to be fixed to one surface of the connection busbar 300 and a body portion configured to extend through the bolt hole 310 of the connection busbar 300 and the fixing hole 131 of the busbar 100, the body portion being provided with a screw valley B configured to be engaged with a screw thread formed in the bolt hole 310 of the connection busbar 300 and the screw thread of the fixing hole 131 of the busbar 100.

The connection bolt 400 may be made of a conductive material so as to transmit electricity while being united with the busbar 100 and the connection busbar 300.

The electrode assembly, the busbar 100, the busbar frame 200, and the connection busbar 300 are received in a module case so as to be protected from external impact. As an example, the module case may include a lower case, the lower surface and the side surfaces of which are surrounded by plates, the lower case having a predetermined space configured to receive the electrode assembly, etc., and an upper case configured to cover the lower case. As needed, the module case may include a flat lower case configured to allow the electrode assembly, etc. to be seated thereon and an upper case, the side surfaces and the upper surface of which are hermetically sealed so as to wrap battery cell including the electrode assembly, etc.

Meanwhile, the upper case and the lower case may be fixed and assembled to each other using a well-known fixing method, such as interference fitting, bolt fastening, or welding.

FIG. 7 is a side sectional view of a battery module according to a second embodiment of the present disclosure, and FIG. 8 is a perspective view of a busbar according to a second embodiment of the present disclosure.

The second embodiment of the present disclosure is identical to the first embodiment except for the shape of the terminal portion 130 of the busbar 100. The initial thickness of the terminal portion 130 of the busbar 100 according to the second embodiment of the present disclosure may be equal to the thickness of the electrode lead connection portion 120. The terminal portion 130 may be bent using a hemming method so as to have two or more layers such that the terminal portion 130 has a predetermined thickness. At this time, the length of an upper terminal portion 130(*a*) of the terminal portion 130 may be greater than the length of a lower terminal portion 130(b), or may be equal to the length of the lower terminal portion 130(b).

A hemmed portion H formed using the hemming method, as described above, is configured to have a shape capable of being seated in the busbar frame 200, and is coupled to a corresponding portion of the busbar frame 200.

The portion of the lower terminal portion 130(b) corresponding to the busbar frame 200 may be partially deformed, whereby the force of coupling with the busbar frame 200 may be improved.

In the busbar 100 according to the second embodiment of the present disclosure, only the lower terminal portion 130(b) may be provided with a screw thread A, or both the upper terminal portion 130(a) and the lower terminal portion 130(b) may be provided with a screw thread A.

In the case in which only the lower terminal portion 130(b) is provided with a screw thread, there is an advantage in that a region to be processed is reduced. However, it is preferable for both the upper terminal portion 130(a) and the lower terminal portion 130(b) to be provided with a screw thread A in order to increase coupling force.

At this time, although it is preferable that no space be provided between the upper terminal portion 130(a) and the lower terminal portion 130(b), an attachment sheet may be disposed in a space S between the upper terminal portion 130(a) and the lower terminal portion 130(b) in order to increase the force of fixing with the connection bolt 400 while preventing the upper terminal portion 130(a) and the lower terminal portion 130(b) from being separated from each other.

FIG. 9 is a perspective view showing the connection relationship between the busbar according to the second embodiment of the present disclosure, the connection busbar, and the connection bolt.

As can be seen from FIG. 9, the terminal portion 130 of the busbar according to the present disclosure and the connection busbar 300 are fixed by the connection bolt 400.

At this time, a screw thread C may be provided in the bolt hole 310 of the connection busbar 300 in order to increase the force of coupling between the connection busbar 300 and the connection bolt 400.

The connection bolt 400 extends through a fixing hole 131 located at each of the upper terminal portion 130(a) and the lower terminal portion 130(b) and a bolt hole 310 of the connection busbar 300. A screw valley B of the connection bolt 400 is fixed by the screw thread A of the fixing hole 131 and the screw thread C of the bolt hole 310. At this time, the terminal portion 130 and the connection busbar 300 are coupled to the connection bolt 400 in a fixed state such that the position of the screw thread A of the fixing hole 131 and the screw thread C of the bolt hole 310 is not changed.

FIG. 10 is a sectional view of a battery module according to a third embodiment of the present disclosure. The third embodiment of the present disclosure is identical to the second embodiment except that a bolt receiving portion 210 of the busbar frame 200 is provided with a fixing portion 211. The fixing portion 211 may also be provided in the first embodiment.

The busbar frame 200 according to the third embodiment is provided with a bolt receiving portion 210 configured to receive the end of the connection bolt 400 after extending through the terminal portion 130 and the connection busbar 300. The bolt receiving portion 210 may have only a space capable of receiving the end of the connection bolt 400. At this time, the bolt receiving portion 210 may include a fixing portion 211 configured to push the end of the connection bolt 400 in a direction perpendicular to an insertion direction in order to increase the force of fixing to the connection bolt 400.

The fixing portion 211 may be made of an elastic material so as to prevent separation of the connection bolt 400.

The fixing portion 211 may be made of an elastic material, a spring may be mounted to the surface of the fixing portion 211 that does not face the connection bolt 400, and a member configured to fix the connection bolt 400 may be mounted to the surface of the fixing portion 211 that faces the connection bolt 400, as shown in FIG. 10.

It is possible to check, through the fixing portion 211, whether the connection bolt 400 extends through the terminal portion 130 and is properly coupled thereto. When the end of the connection bolt 400 is coupled to the fixing portion 211, it is possible to check the position of the connection bolt 400 through a change of the physical position of the fixing portion 211 by the connection bolt 400.

Meanwhile, the present disclosure provides a battery pack including the battery module, and the battery module or the battery pack may be used in a device.

For example, the device may be a laptop computer, a netbook computer, a tablet PC, a mobile phone, an MP3 player, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart, or an energy storage system. However, the present disclosure is not limited thereto.

Those skilled in the art to which the present disclosure pertains will appreciate that various applications and modifications are possible within the category of the present disclosure based on the above description.

DESCRIPTION OF REFERENCE SYMBOLS 10, 100: Busbars
11, 110: Slits
12, 120: Electrode lead connection portions
13, 130: Terminal portions
130(a): Upper terminal portion
130(b): Lower terminal portion
131: Fixing hole
20, 200: Busbar frames
21, 210: Bolt receiving portions
211: Fixing portion
30, 300: Connection busbars
310: Bolt hole
40, 400: Connection bolts
50: Connection nut
60: End cover
A: Screw thread
B: Screw valley
C: Screw thread
H: Hemmed portion
S: Space

The invention claimed is:

1. A battery module comprising:
 a busbar that electrically connects electrode leads protruding from an electrode assembly to the busbar;
 a busbar frame accommodating the busbar, the busbar being fixed to the busbar frame;
 a connection busbar connected to the busbar; and
 a connection bolt connecting to the busbar with the connection busbar therebetween,
 wherein the busbar comprises a first screw thread, and wherein the connection bolt is fixed to the first screw thread.

2. The battery module according to claim 1, wherein the busbar comprises:
   a slit having each of the electrode leads extended therethrough;
   an electrode lead connection portion connecting the electrode leads to the busbar; and
   a terminal portion connected to the connection busbar,
   wherein the terminal portion comprises a fixing hole, the fixing hole comprising the first screw thread.

3. The battery module according to claim 1, wherein the connection bolt is not coupled to a nut.

4. The battery module according to claim 2, wherein a thickness of the terminal portion is greater than a thickness of the electrode lead connection portion.

5. The battery module according to claim 4, wherein the terminal portion comprises two or more layers.

6. The battery module according to claim 5, wherein the terminal portion is bent.

7. The battery module according to claim 5, wherein the first screw thread is formed in the two or more layers of the terminal portion.

8. The battery module according to claim 5, wherein no space is provided between the two or more layers.

9. The battery module according to claim 4, wherein a portion of the busbar excluding the terminal portion is thinner than the terminal portion.

10. The battery module according to claim 9, wherein a portion of the terminal portion that is connected to the electrode lead connection portion is thinner than a remaining portion of the terminal portion.

11. The battery module according to claim 1, wherein the connection busbar comprises a second screw thread, and
    wherein the connection bolt is fixed to the second screw thread.

12. The battery module according to claim 1,
    wherein the busbar frame comprises a bolt receiving portion receiving an end of the connection bolt extending through the busbar and the connection busbar, and
    wherein the bolt receiving portion comprises a fixing portion pressing the end of the connection bolt in a direction perpendicular to an insertion direction.

13. The battery module according to claim 12, wherein the fixing portion is made of an elastic material.

14. The battery module according to claim 1, wherein
    the connection busbar includes a bolt hole;
    the busbar includes a fixing hole; and
    the connection bolt includes a body portion and a head portion having a diameter greater than a diameter of the bolt hole so as to be fixed to one surface of the connection busbar while the body portion extends through the bolt hole and the fixing hole of the busbar to be fixed to the first screw thread of the busbar.

* * * * *